United States Patent [19]
Laceby et al.

[11] Patent Number: 5,203,524
[45] Date of Patent: Apr. 20, 1993

[54] VIBRATION DAMPING ARRANGEMENT FOR AIRCRAFT

[75] Inventors: Maurice A. Laceby; Cyril R. Fletcher, both of Bristol, England

[73] Assignee: British Aerospace Public Limited Company, London, England

[21] Appl. No.: 739,057

[22] Filed: Aug. 1, 1991

[30] Foreign Application Priority Data

Aug. 2, 1990 [GB] United Kingdom ............... 9017012

[51] Int. Cl.$^5$ ............................................. B64C 13/16
[52] U.S. Cl. ................................... 244/75 A; 244/215
[58] Field of Search ................... 244/75 A, 213, 215, 244/130, 129.1, 1 R, 76 C; 181/33.01, 33.04

[56] References Cited

U.S. PATENT DOCUMENTS

| | | | |
|---|---|---|---|
| 2,332,516 | 10/1943 | Kemmer | 244/75 A |
| 2,342,578 | 2/1944 | Giannini | 244/75 A |
| 2,471,857 | 5/1949 | Bleakney et al. | 244/75 A X |
| 4,651,955 | 3/1987 | Krafka | 244/75 A X |
| 4,705,236 | 11/1987 | Rudolph | 244/215 X |
| 4,763,862 | 8/1988 | Steinhauer et al. | 244/215 |

FOREIGN PATENT DOCUMENTS

| | | |
|---|---|---|
| 0075966 | 4/1983 | European Pat. Off. . |
| 719771 | 2/1932 | France . |
| 529782 | 11/1940 | United Kingdom . |
| 748549 | 5/1956 | United Kingdom . |
| 787535 | 12/1957 | United Kingdom . |
| 953302 | 3/1964 | United Kingdom . |

*Primary Examiner*—Margaret A. Focarino
*Assistant Examiner*—Carla Mattix
*Attorney, Agent, or Firm*—Cushman, Darby & Cushman

[57] ABSTRACT

An arrangement and method for damping induced fundamental vibrations in an aircraft high lift device (3) are provided. The arrangement includes a wing (2), a high lift device (3) mounted upon and movable along a predetermined path with respect to the wing between a stowed cruise position and an extended high lift position, a track beam (8) interconnecting the wing and the high lift device (3), and a damping device (15) interconnecting the track beam and said wing and the track beam (8) pivotally connected to the wing (2) and including a trackway (20) for sliding interconnection with the high-lift device (3) such that while the high lift device (15) operates within acceptable vibrational tolerances the damping device is isolated but induced fundamental vibrations will cause angular displacement of the track beam (8) inducing a reactive force in the the damping device (15) to substantially nullify the fundamental vibrations.

5 Claims, 1 Drawing Sheet

VIBRATION DAMPING ARRANGEMENT FOR AIRCRAFT

BACKGROUND TO THE INVENTION

This invention relates to vibration damping arrangements for aircraft. More particularly it relates to means for damping out fundamental vibrations in an aircraft high lift system, for example wing trailing edge flaps and leading edge slats.

DESCRIPTION OF THE PRIOR-ART

In well known arrangements of wing high lift systems, spanwise portions of flaps or slats are mounted upon the fixed wing structure by chordwise support tracks, by which, means they are translatable or extendable with respect to the fixed structure to adopt a high lift configuration for the landing mode or intermediate take-off settings. In certain flight conditions, fundamental vibrations may be induced in the flap portions which may give rise to significant structural distortion and damage. It is the object of the present invention to provide means for damping these induced vibrations and substantially minimizing structural distortion.

SUMMARY OF THE INVENTION

According to one aspect of the present invention there is provided a method of damping induced fundamental vibration in an aircraft high lift device including the steps of transmitting a signal indicative of the scale of the vibrations to a damping device, including a reactive force in said damping device in response to the signal and supplying the reactive force to the high lift device to substantially nullify the fundamental vibrations. The arrangement being such that whilst the high lift device operates within acceptable vibrational tolerances, the damping device is isolated, but induced fundamental vibrations will cause angular displacement of the track beam inducing a reactive force in the damping device to substantially nullify the fundamental vibrations.

According to a further aspect of the present invention, there is provided an arrangement for damping induced fundamental vibrations in an aircraft wing high lift device, the arrangement including:

a wing, a high lift device mounted upon and movable along a pre-determined path with respect to the wing between a stowed cruise position and an extended high lift position, a track beam interconnecting the wing and the high lift device and being pivotally connected to the wing and including a trackway for sliding interconnection with the high-lift device, and a damping device interconnecting the track beam and the wing for clamping of angular displacement therebetween.

The arrangement being such that, whilst the high lift device operates within acceptable vibrational tolerances, the damping device is isolated, but induced fundamental vibration will cause angular displacment of the track beam including a reactive force in the damping device to substantially nullify the fundamental vibrations.

BRIEF DESCRIPTION OF THE DRAWINGS

One embodiment of the invention will now be described, by way of example only, and with reference to the following in which.

DESCRIPTION OF PREFERRED EMBODIMENT

Figure 1:
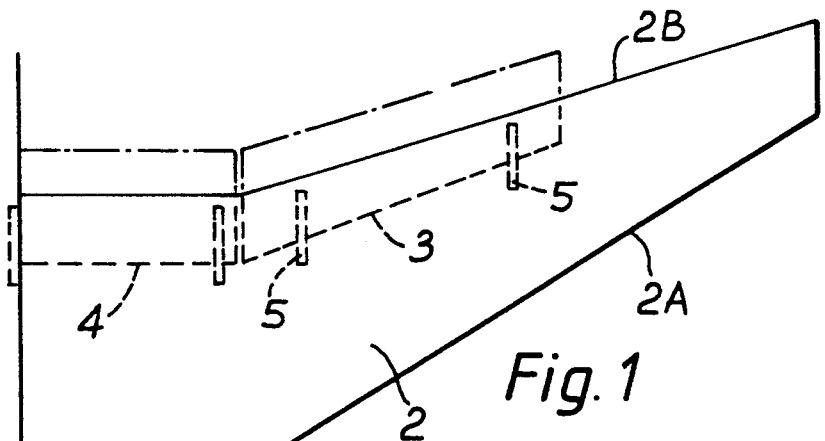
FIG. 1 illustrates in diagrammatic plan of a typical aircraft wing incorporating a pair of trailing edge flaps.

Referring to the drawing, FIG. 1 illustrates in diagrammatic plan form a typical port side wing 2 of an aircraft, having a leading edge 2A a trailing edge 2B and a pair of spanwise trailing edge flaps 3 and 4. Both flaps are supported on chordwise extending tracks 5, by which, means they are translatable rearwardly with respect to the fixed wing structure over a range of operating positions.

In certain flight conditions with extended high lift devices fundamental vibrations can be induced in one or more of the flap portions such that the flap may be subjected to extreme conditions of curvature over the Span 'S' as illustrated with associated structural distortion and possible failure or damage. In extreme conditions, if the overall effective distortion 'D' at the extremity of one flap portion is at variance with that occurring at the adjoining extremity of an adjacent flap portion, structural interference between these adjacent parts may result in jamming. In extreme modes of vibration one or more flap portions could become detached from the aircraft with catastrophic results. It is known that such condition can be at least minimised by the application of a force at some point along the flap span and which will effectively dampen out the vibration. It is necessary, however, to ensure that such a damping force is ineffective in normal operating conditions such that it cannot influence the normal control forces on the flap.

Figure 3:
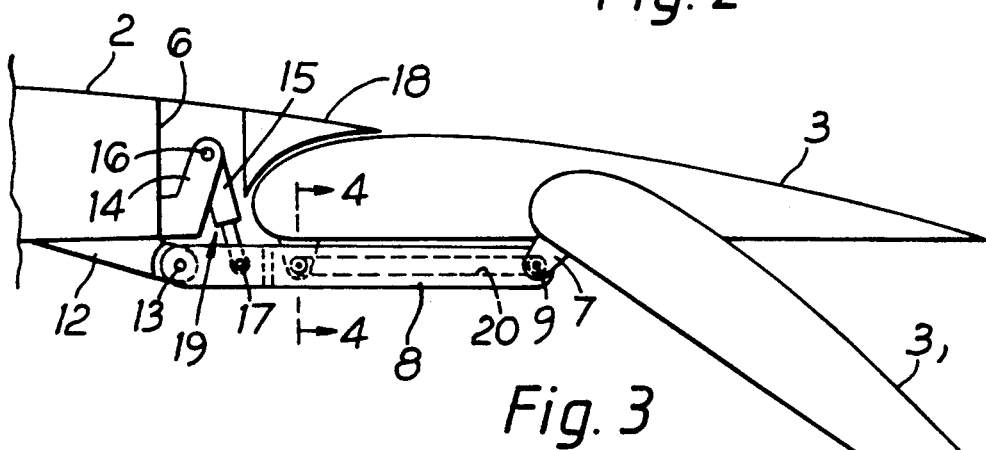
FIG. 3 illustrates in diagrammatic side elevation a wing trailing edge flap installation incorporating the present invention.
Figure 4:
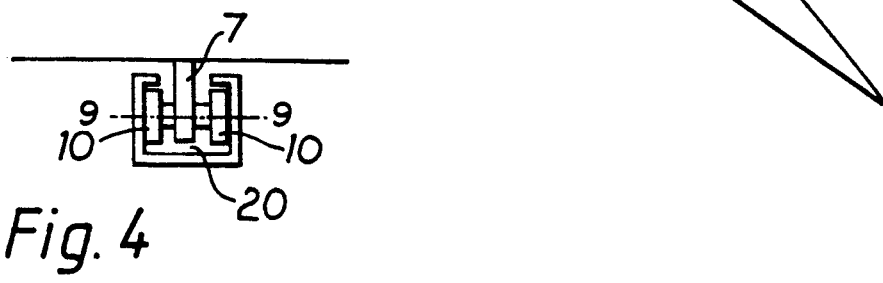
FIG. 4 is a section through a portion of the installation taken along a line 4—4 in FIG. 3.

Such an arrangement is illustrated with reference to FIGS. 3 and 4 in which a trailing edge flap 3 is shown in its stowed cruise location relative to the fixed trailing edge upper shroud structure 18, the shroud extending rearwardly of the near spar 6 or of the wing 2.

In operation the flag 3 translates rearwardly from its stowed position to a rotated fully deployed landing setting 3. It may alternatively adopt an intermediate take-off position not shown here. The flap position and attitude is controlled by a flap operating mechanism, not shown and is supported relative to the wing 2 on flap support tracks 5 (see FIG. 1).

In accordance with the present invention the flap installation incorporates a vibration damping installation 19 in which the flap 3 is indirectly connected to a damper strut 15 by means of a track beam 8 which is pivotally connected at 13 to a mounting bracket 12 located to the wing lower surface. The track beam 8 further includes a trackway 20 for engaging a pair of rollers 10 mounted to a lug 7 about a pivot axis 9, the lug 7 depending from the lower surface of the flap 3 adjacent to its leading edge. A mounting bracket 14 provides an upper pivotal attachment 16 for the damper strut 15, the lower end of which is pivotally attached at 17 to the track beam 8.

Figure 2:
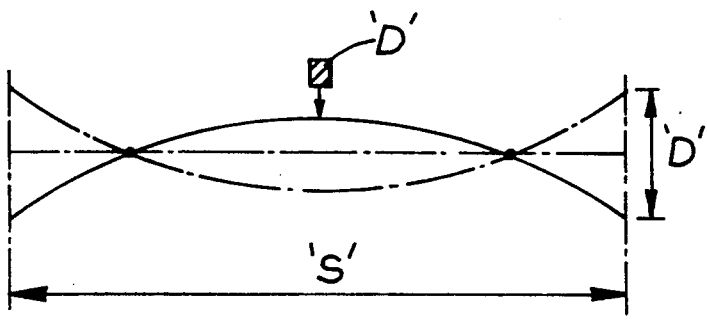
FIG. 2 graphically illustrates the fundamental vibrations associated with a portion of trailing edge flap.

The geometry is arranged so that the track beam 8 lies substantially parallel to the lower surface of the flap 3 and although the flap is constrained by its flap support and operating mechanism (previously referred to) and follows a pre-defined path, the location of roller pair 10 in relation to the flap 3 and the geometry of the trackway 20 in the pivotally attached track beam 8 are so configured so that the change in length of the damper strut 15 resulting from development of the flap produces damping forces which are very low compared with those resulting from the free or induced vibration of the flap, and hence give rise to negligible effects during flap translation. If however, induced fundamental vibrations occur in the flap in its extended location, the consequential distortion of the flap relative to its datum position, as described with reference to FIG. 2, will be transmitted to the trackbeam 8 via the leading edge roller engaging with the track beam 8, with a resultant angular displacement of the beam about its pivotal attachment 13. This, in turn, will induce in the damper strut 15 a countering load.

Although this invention is described in the context of an aircraft trailing edge flap system, it may equally be applicable to other translating high lift devices such as leading edge slats irrespective of their deployment loci.

We claim:

1. A method of damping induced fundamental vibrations in an aircraft high-lift device comprising the steps of:
   providing a damping device operatively associated with the high-lift device, said damping device including a damper strut being pivotly connected to a track beam, said track beam interconnecting an aircraft wing and said high-lift device, said track beam being pivotably connected to said aircraft wing, said track beam including a trackway for sliding interconnection with said high-lift device;
   including a reactive force in said damping device in response to said fundamental vibrations; and
   applying said reactive force to said high-lift device to substantially nullify said fundamental vibrations.

2. An apparatus for damping induced fundamental vibrations in an aircraft high-lift assembly comprising:
   an aircraft wing;
   a high-lift device movably mounted along a predetermined path with respect to said wing between a stowed cruise position and an extended high-lift position;
   a track beam interconnecting said aircraft wing and said high-lift device, said track beam being pivotably connected to said aircraft wing, said track beam including a trackway for sliding interconnection with said high-lift device; and
   a damping device interconnecting said track beam and said aircraft wing for damping of angular displacement therebetween, induced fundamental vibrations of sufficient magnitude causing angular displacement of said track beam with respect to said wing which in turn induces a reactive force in said damping device to substantially nullify said fundamental vibrations.

3. An apparatus as claimed in claim 2, wherein said high-lift device includes rollers movably disposed in said trackway.

4. An apparatus as claimed in claim 2, wherein said damping device includes a damper strut, said damper strut having a lower end pivotly connected to said track beam.

5. An apparatus as claimed in claim 4, wherein said damper strut is pivotly connected to a bracket at an upper end thereof, said bracket being affixed to a rear spar portion of said aircraft wing.

* * * * *